United States Patent [19]

O'Neill et al.

[11] Patent Number: 5,274,572

[45] Date of Patent: * Dec. 28, 1993

[54] METHOD AND APPARATUS FOR KNOWLEDGE-BASED SIGNAL MONITORING AND ANALYSIS

[75] Inventors: Dennis M. O'Neill; Peter W. Mullarkey; Paul C. Gingrich, all of Austin, Tex.; Laurent L. Moinard, Seattle, Wash.

[73] Assignee: Schlumberger Technology Corporation, Austin, Tex.

[ * ] Notice: The portion of the term of this patent subsequent to Jul. 3, 2007 has been disclaimed.

[21] Appl. No.: 489,053

[22] Filed: Mar. 6, 1990

Related U.S. Application Data

[63] Continuation-in-part of Ser. No. 128,658, Dec. 2, 1987, Pat. No. 4,939,648.

[51] Int. Cl.$^5$ ............... G06F 15/20; G06F 15/46
[52] U.S. Cl. ............................. 364/550; 364/422; 364/551.01; 395/11
[58] Field of Search .......... 364/550, 551.01, 422, 364/554; 395/11

[56] References Cited

U.S. PATENT DOCUMENTS

| | | | |
|---|---|---|---|
| 4,517,468 | 5/1985 | Kemper et al. | 364/551.01 X |
| 4,642,782 | 2/1987 | Kemper et al. | 364/554 X |
| 4,644,479 | 2/1987 | Kemper et al. | 364/550 |
| 4,646,240 | 2/1987 | Serra et al. | 364/422 |
| 4,791,618 | 12/1988 | Pruchnir | 364/422 X |
| 4,939,648 | 7/1990 | O'Neill et al. | 364/422 |
| 4,975,865 | 12/1990 | Carrette et al. | 364/550 X |
| 5,122,976 | 6/1992 | Bellows et al. | 364/550 |

OTHER PUBLICATIONS

"Dipmeter Advisor Expert System" AARG Bulletin, vol. 66, No. 10, 1982, pp. 1703-1704.
Skandsen et al., "An Expert System For Interpretation of Lithology from Wireline Log Data", Gedexploration, vol. 24, No. 3, 1987.
Kuo, "Field-Scale Statigraphic Correlation Using A.I.", Geo Byte vol. 2, No. 2, May 1987.
Smith, "On the Development of Commercial Expert Systems," AI Magazine, vol. 5, No. 3, 1984, pp. 61-73.
O'Neill, D. M. and P. W. Mullarkey "A Knowledge-Based Approach to Real Time Signal Monitoring", Computer Society Press Repring, Mar. 1989, pp. 133-140.
Erman, L. D., F. Hayes-Roth, V. R. Lesser, D. R. Reddy, "The Hearsay-II Speech-Understanding System: Integrating Knowledge to Resolve Uncertainty", Computing Surveys, 12(2):213-253, Jun. 1980.
Hendrix, G. G., "Encoding Knowledge in partitioned Networks", In Associative Networks-The Representation and Use of Knowledge in Computers, pp. 51-92, Academic Press, New York, N.Y., 1979.
Reboh, R., "Knowledge Engineering Techniques and Tools in the Prospector Environment", Technical Report 243, SRI International, Menlo Park, Calif., Jun. 1981.
Smith, R. G. and P. J. Carando, "Structured Object Programming in Strobe", SDR Research Report SYS-86-26, Sep. 1986.

Primary Examiner—Kevin J. Teska
Attorney, Agent, or Firm—Charles D. Huston

[57] ABSTRACT

A method and apparatus for monitoring and analysing signal data which uses a network model describing the system under investigation and a runtime agent for acquiring the signal data and accessing the model if an anomaly in the signal data is indicated. The network model describes events of interests and how the events relate to phenomena in the system. The network model is constructed using an object-oriented approach with: observations of the events of interests in the system; situations which describe possible underlying causes of the observations; and relations which specify the logical relationship between the observations and situations. The runtime agent is constructed with an object-oriented approach using observers which monitor the signal data and compute whether an anomaly in the incoming signal data exists. If an anomaly is identified, an "observation" is generated and the network model entered to analyse the observation and estimate a cause of the observation. The method and apparatus are applicable for interpreting phenomena in a wide variety of physical systems and have been exemplarily applied to monitoring the quality of oil well logging and laboratory material test sensor configurations.

22 Claims, 13 Drawing Sheets

FIGURE 5

```
ObserverEditor R1-VOLTAGE-VARIANCE DETECTOR
 Left button here for editor menu    Right button here for window menu
Observer: R1-VOLTAGE-VARIANCE-DETECTOR
SYNONYMS:
GENERALIZATIONS: VOLTAGE-DETECTOR VARIANCE-DETECTOR
GROUPS:
TYPE: CLASS
Edited: 25-Aug-88 14:12:50 EDT         By: Oneill
Basic Slots:
 CHANNEL[OBJECT]: R1-VOLTAGE
 OBSERVATION[STROBETUPLE2]: (KB=OSR O=R1-VOLTAGE-HIGH-VARIANCE)
Computations:
 ATTRIBUTE =
    (5POINTAVERAGE
       (ABSOLUTEVALUE
          (TWOPOINTDIFFERENCE R1-VOLTAGE)))
Test:
IF(HIGH ATTRIBUTE)
   which is equivalent to (ATTRIBUTE >= 2.0)
 THEN Assert that the Observation is present
 ELSE Deny that the Observation is present
Other Slots:
 CUTOFFVALUE[REAL]: 2.0
 MINIMUMLENGTH[EXPR]: 5.0
 MAXIMUMGAP[EXPR]: 1.0
```

FIGURE 12

```
ObserverEditor: LSHV-ACTIVE-DETECTOR
| Left button here for editor menu | Right button here for window menu |
Observer: LSHV-ACTIVE-DETECTOR
SYNONYMS:
GENERALIZATIONS: LSHV-DETECTOR ACTIVE-DETECTOR
GROUPS: LDTC LDTA LDT TRIGGEROBSERVATIONDETECTOR INTDET LDTD
TYPE: CLASS
Edited: 25-Aug-88 16:06:51 EDT          By: Oneill
Basic Slots:
 CHANNEL[OBJECT](^): LSHV
 OBSERVATION[STROBETUPLE2]: (KB=OSR O=LSHV-HIGH-VARIANCE)
Computations:
 ATTRIBUTE =
     (5POINTAVERAGE
         (ABSOLUTEVALUE
             (TWOPOINTDIFFERENCE LSHV)))
Test: (^)
IF (GE-QUALIFIER ATTRIBUTE)
    which is equivalent to (ATTRIBUTE >= 2.0)
  THEN Assert that the Observation is present
  ELSE Deny that the Observation is present
Other Slots:
 LOWERCUTOFF[REAL]: 2.0
 MINIMUMLENGTH[EXPR]: 5.0
 MAXIMUMGAP[EXPR]: 1.0
 MINIMUMAFTERGAP[EXPR]: 2.0
```

METHOD AND APPARATUS FOR KNOWLEDGE-BASED SIGNAL MONITORING AND ANALYSIS

BACKGROUND OF THE INVENTION

This application is a continuation in part of U.S. Ser. No. 128,658 filed Dec. 2, 1987 now, U.S. Pat. No. 4,939,648 (incorporated by reference) and the benefit of 35 U.S.C. Section 120 is claimed.

FIELD OF THE INVENTION

This invention relates to the field of knowledge based computer systems applied to monitor and analyse phenomena in a physical system. In particular the present invention describes a method and apparatus which monitors a physical system in near real time for anomalies, and upon detection of an anomaly, estimates an explanation of the anomaly.

The Context of the Invention

As the next generation of knowledge-based or artificial intelligence systems begins to emerge, they will be characterized by their ability to deal directly with the real world environment rather than via a human intermediary. Among the more interesting classes of problems of this type are those that deal with the interpretation of observations of physical systems. Process monitoring and diagnostic systems are an important subclass. In these systems, a key aspect is to determine when an actual problem has taken place. While outright failures are relatively easy to detect; in many cases more subtle problems may be masked by artifacts of normal operation of the process being studied, its external environment, or the monitoring process itself. In order to detect these problems, it is often necessary to use detectors that are sensitive to a wide range of anomalous behavior and then use domain knowledge to classify the detected events into those that are truly problematical and those that do not require action.

The general problem area addressed by the present invention is monitoring systems that operate in a real-world environment via the analysis of signals generated within that environment with the objective of determining one or more properties of the system and/or environment. This analysis can take a variety of forms depending on the objectives of the monitoring system. In the simplest case, the objective might be to merely summarize the data into a more compact (symbolic) form. In slightly more complicated situations, the objective might be to determine, based on the signal data, the state of the external environment and how it changes over time. In the general case, the monitoring system may need to interact with and cause changes in the external environment in order to either change the behavior of the system under study or the monitoring process itself. The main aspects considered by the present invention are:

Signal interpretation-in which the objective is to infer the state of the external environment based on the sampled signal(s).

Multi-sensor fusion-in which the objective is to combine information from several different signal sources in order to arrive at a more complete description of the environment than could be determined from any individual sensor.

Anomaly detection-in which the objective is to determine whether the system under study is behaving in an anomalous manner.

Anomaly classification-in which the objective is to determine whether anomalous behavior is due to a problem in the system under study or is due to some artifact of the environment or monitoring process.

Problem diagnosis-in which the objective is to determine the cause of a problem in the system under study.

In a particular real world signal monitoring application, one or more of these aspects are typically present. For example, in industrial process control applications, problem detection and diagnosis aspects are usually both present. In many military applications, signal interpretation, and more increasingly, sensor fusion with the objective of threat identification or characterization are the key aspects.

The preferred embodiments disclosed herein address two specific problem areas. The first problem area relates to monitoring the performance of the tools used in wireline well logging. This problem is discussed in U.S. Pat. No. 4,939,648, incorporated by reference. The second problem area relates to monitoring the performance of the acquisition sensors used in a laboratory system for determining properties of materials. In both problem areas, the testing engineer wants to ensure that the tools or sensors are acquiring data properly. If, for example, the testing engineer noticed data acquired from a particular tool or sensor was unusual, the engineer would investigate further to attempt to determine the cause (if any) of the unusual data. Appropriate action might be taken-e.g. replacement of a defective tool or sensor, adjustment of controls, or a rerun of the data acquisition.

Many difficulties exist for the testing engineer attempting to monitor and analyse such tool or sensor performance. First, the engineer must recognise that unusual data is being acquired. Second, the engineer is dependent on his own knowledge to recognize that unusual data is being acquired and to generate an explanation for the unusual data. This can be a near impossible task in a system having multiple sensors, with perhaps multiple data channels, where the engineer's attention is more focused on a quantitative analysis of the data-particularly if the engineer's experience level is low.

Description of Related Work

The previous work related to these problem areas fall into two main categories: signal to symbol transformation and real time monitoring systems.

Signal To Symbol Transformation

HEARSAY instituted the blackboard architecture to deal with the problem of real time speech understanding. In this application, the system dealt with a single source of a continuous signal (digitized speech). In HASP/SIAP, an ocean surveillance system, the same technique was extended to deal with multiple signal sources of the same general type (sonar arrays) and was also able to deal with "external knowledge" in the form of sighting reports. The Ventilation Manager (VM) was a system to monitor respiratory-assisted patient status using a series of discrete readings from a variety of different sensors. TRICERO, another blackboard-based system, was an airspace surveillance system which integrated a number of different data sources in assessing (potentially hostile) aircraft activities. TRICERO coordinated the operation of two separate subsystems, one which specialized in the interpretation of electronic emissions (ELINT) and the other which focused on voice communication data (COMINT).

The level of sophistication of the signal processing in these systems has ranged from the quite simple (knowledge-based bounds checking in VM) to more traditional algorithmic parameter estimation and extraction in HEARSAY and HASP/SIAP. All of the blackboard-based systems utilized their symbolic knowledge of the domain to refine their interpretations of the initial signal data, and in many cases used this knowledge to return to the signal data to extract additional information based on expectations that were derived from their symbolic analysis. These systems differ somewhat in their handling of erroneous or noisy data. VM used its knowledge of what readings were "reasonable" in a given situation in order to reject implausible values. Both HEARSAY and HASP/SIAP used a model-driven approach in which knowledge of the domain (vocabulary and syntax in the former, characteristic acoustic signatures in the latter) is used to prune unlikely or unrecognizable data elements from the search space. ELINT required signals from a particular radar emitter to persist over a number of sample intervals in order to eliminate "ghost images" from consideration.

Another aspect of a number of these systems that has received a lot of interest recently has been sensor fusion. HASP/SIAP reflected this approach in a rudimentary way by utilizing external information in the form of siting reports which were posted on an "expectation list" for use by other parts of the system. TRICERO addressed the problem more directly through the use of semi-autonomous "sub-experts" (ELINT and COMINT) for each kind of input with a correlation expert which arrived at the overall assessment of the external environment. Process monitoring systems such as the PICON applications and COOKER explicitly integrate information from many different sensors in arriving at their assessments and recommendations, but they differ from the preceding systems in that, due to the nature of the problem, they always know which readings are relevant to a particular situation and which are not. In the general case, it is still difficult to determine when it is appropriate to combine findings from several different kinds of sensors in arriving at an overall assessment of the situation.

Real Time Monitoring Systems

As the processing power of symbolic computing systems has increased, and the tools available for building applications have matured, there has been an ever-increasing interest in applying these techniques to real world, real time problems. While all of the military applications discussed above were targeted at real time applications, the information published in the open literature implies that they have only been operated in simulated or off-line (playback) situations. This is also true for a number of industrial applications such as satellite power system control. There have been a number of real time advisory systems that have been installed in actual production environments. Among these are applications in the areas of refinery operations, and manufacturing batch processes. In these systems, the kinds of computations that are performed on their input data are typically quite simple, with range checking and simple numeric expressions being the norm.

In order to meet their hard real time constraints, they typically monitor only a small number of their potential inputs at any given time and request additional data only when pursuing a particular line of reasoning. Depending on the nature of the process control system they interface to, they may only be able to access data acquired after the time of the request rather than that which could have been acquired at the time of the triggering event. In many applications, this is perfectly reasonable, but there is a large class of applications where, due to the nature of the source of the signals, such historical information may no longer be available.

SUMMARY OF THE INVENTION

The deficiencies of the related art referenced above are largely solved by the method and apparatus of the present invention. Broadly speaking the method and apparatus of the present invention monitors a plurality of signals indicative of phenomena in the system under investigation. If a monitored signal value meets defined criteria-i.e. an "anomaly" is detected-then the method generates an explanation for the anomaly.

The method and apparatus of the present invention provide an analysis network in which the behavior and problem modes of the system are defined. Preferably, the network is constructed using object-oriented programming and reflects the real world behavior of the system as postulated by an expert in the system (i.e. "domain" expert). The method provides an "observer" for monitoring signals from the system and to test for the presence of an anomaly. If an anomaly is detected, then an "observation" is reported to the analysis network. Upon receiving an "observation" the analysis network consults additional observers to consider the signal values of these respective observers. Whether these additional observers meet their respective defined criteria guides the analysis in the network. The method generates an explanation of the "observation" based on this analysis.

In a preferred form the method and apparatus continuously operate a number of observers as detectors for anomalous behavior in their respective signals. Advantageously, the signals can be acquired and analysed in near real time. (As used herein, "near real time" means the analysis occurs substantially concurrent with the signal acquisition process; that is, the method can generate an explanation during data acquisition in most cases.)

In the typical method of operation, from time to time a set of signal values are acquired in digital form from an acquisition system-typically multiple sensors each measuring a phenomena in the system under investigation. Each set of signal values are grouped in a data frame with an identifying index, such as the time of signal acquisition or the position of the sensors at the time of acquisition. Each observer can therefore be constructed to report an observation if the monitored signal value fails to meet a defined algorithm and if the failure occurs over a defined time interval. Although preferably an explanation is generated after the completion of analysis, it is possible to generate a best guess explanation that is incrementally updated as additional observers are consulted in the analysis network.

Advantageously, a method is provided for direct knowledge acquisition from domain experts without the need for a computer scientist as an immediary. That is, an easy to use editor is provided which permits the domain expert to directly specify the criteria for defining an observation (i.e. anomalous data and the networks for analysing the observation).

BRIEF DESCRIPTION OF THE DRAWINGS

FIGS. 3-9 illustrate the operation of an embodiment of the present invention in a laboratory system for determining the properties of materials where it is desirable to monitor the performance of the sensors, where:

FIG. 3 schematically shows the laboratory set-up;

FIG. 4 illustrates the editor to build a network for testing performance of a sensor;

FIG. 5 depicts the editor for building an observer, with defined criteria for an anomaly;

FIG. 6 illustrates an analysis network invoked if an anomaly is detected;

FIG. 7 depicts the runtime explanation of the sensor anomaly;

FIG. 8 is a representation of a partial situation taxonomy for the embodiment of FIGS. 3-7; and FIG. 9 is a representation of a partial observation taxonomy for the embodiment of FIGS. 3-7.

FIGS. 11-13 depict another embodiment of the present invention for monitoring the quality of the data acquired by the tools in a wireline well logging system, where:

FIG. 11 is a schematic sectional view of a typical wireline well logging system;

FIG. 12 depicts the editor for defining the criteria for an observation from the LSHV Active detector; and FIG. 13 illustrates the network constructed for LSHV High Variance observation.

DESCRIPTION OF THE PREFERRED EMBODIMENTS

General Description

The method and apparatus of the present invention uses a runtime agent employing observers to monitor raw data signals (FIG. 1) and an analysis network to generate an explanation for detected anomalies in the raw data signals. The analysis network is constructed using a knowledge representation scheme. The knowledge representation scheme is implemented using an object-oriented approach, and is based on four basic constructs: Observers, Observations, Situations, and Relations.

Observers are the computational units/agents which perform the basic signal-to-symbol transformation on incoming streams of data. An observer's class definition specifies the data channels on which it will operate, the phenomenon that is trying to be observed, and the algorithm that is to be used in determining the presence or absence of the phenomenon. In addition to the observer itself, all of its operators and test predicates are also implemented as class objects. Through the use of inheritance hierarchies, it is very easy to rapidly define families of observers that either operate on the same input data channels or look for the same kind of phenomena over different data channels (e.g., spikes, flat intervals, high frequency intervals, etc.).

Observations (FIG. 1) are the phenomena of interest in the domain being monitored. An observation's class definition specifies those situations which could give rise to a particular observation as well as which observers can be used in assessing whether a particular observation can be made.

Situations (FIG. 1) are the real world events and/or states which could be the underlying cause for the presence of a particular observation. A situation's class definition specifies those observations and/or other situations whose presence will (positively or negatively) affect the belief in a particular situation.

Relations (FIG. 1) are logical connectives which are used to specify causal relationships between observations and situations.

Figure 1:
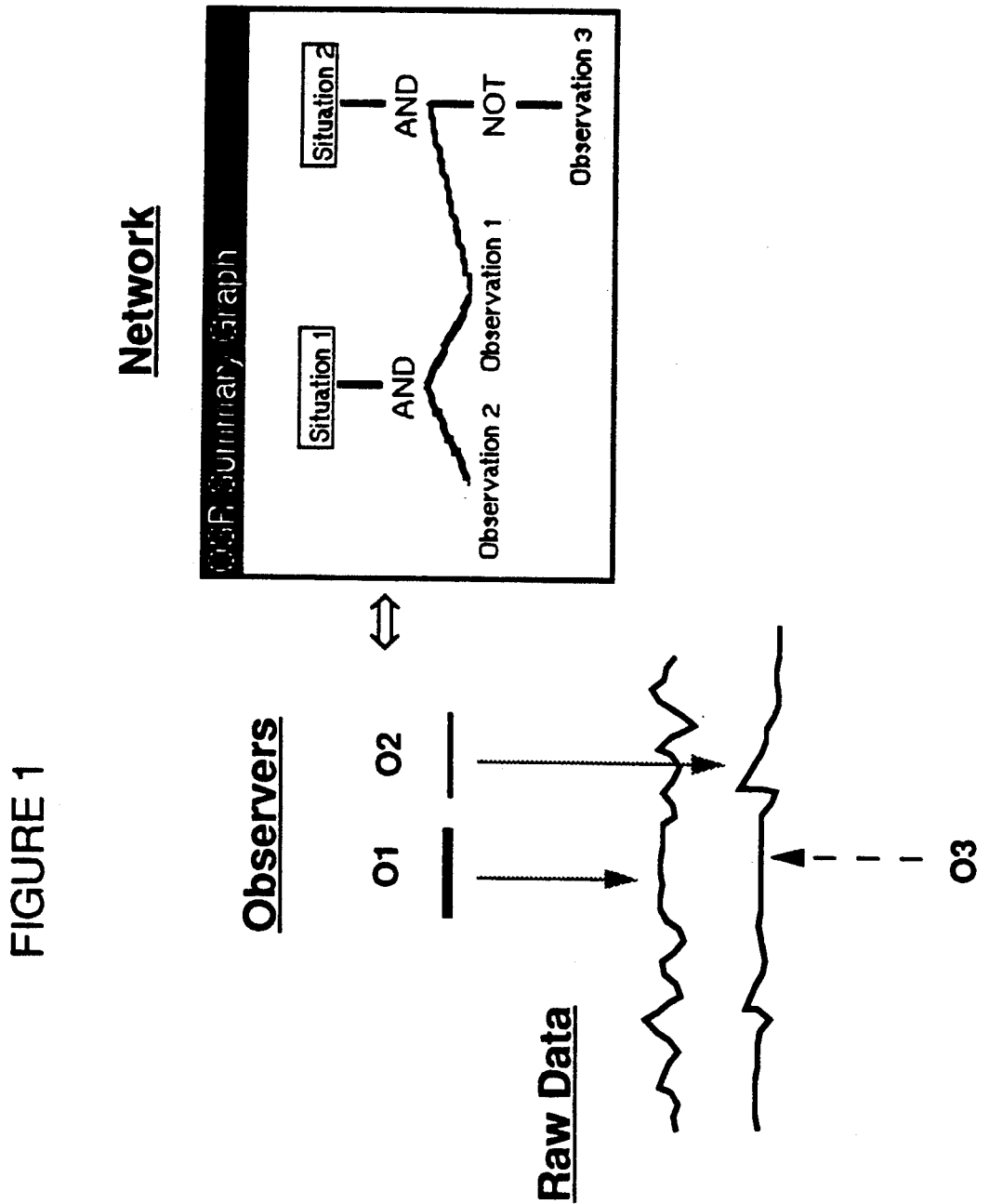
FIG. 1 is a schematic representation of the operation of the observers in monitoring raw data and the interface with the network.
Figure 2:
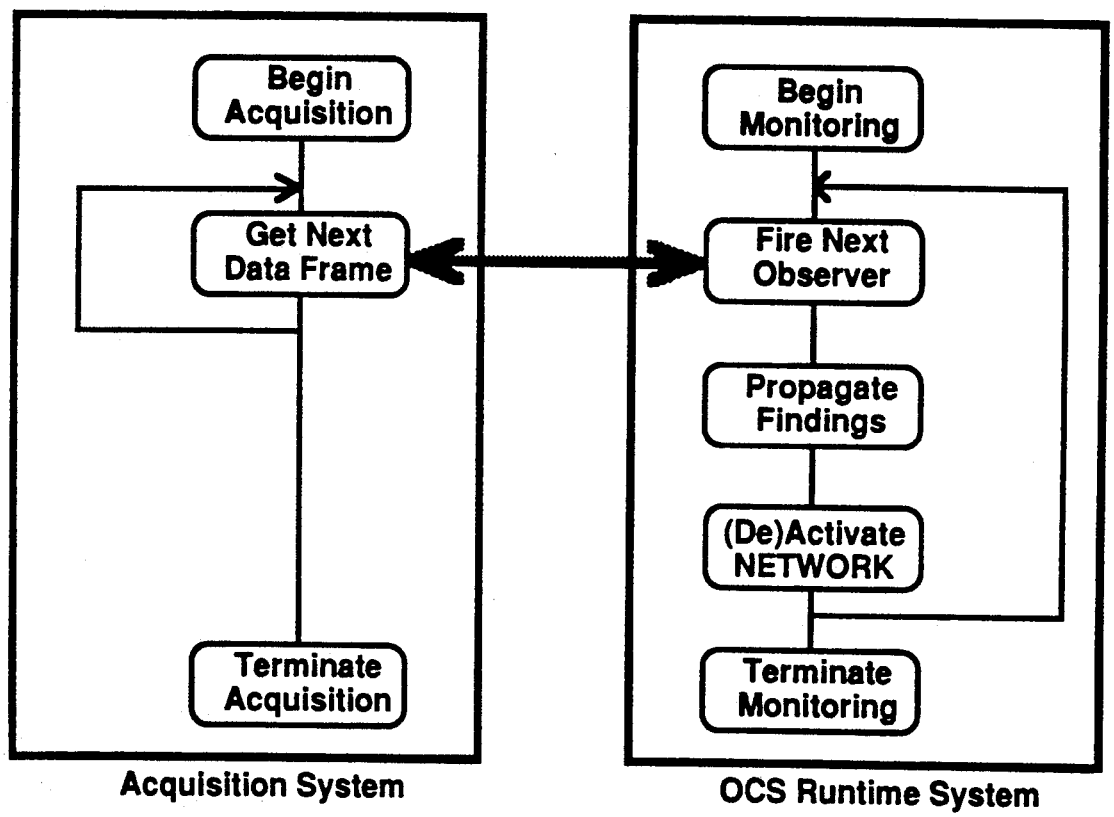
FIG. 2 is a schematic representation of an acquisition system interface with the method and apparatus of the present invention.

These latter three constructs are used by domain experts to specify models known as Observation-Situation-Relation (OSR) networks or analysis networks which define the behavior and failure modes of the system under study. FIG. 1 shows a simplistic network in which Observation 1 suggests Situation 1 and Situation 2 which further involve Observation 2 and Observation 3. In using the present invention in a particular application, a domain expert (with minimal assistance of a knowledge engineer) first described the domain in terms of networks, defines the corresponding observers in order to relate the model to real world data, and finally specifies how the data sources are to be connected to the runtime agent.

Once the domain model has been specified, the runtime portion of the present invention is brought into play. The method of the present invention operates under the assumption that from time to time a new set of data channel values, called a data frame, will become available with an identifying index (e.g., the time at which the data was measured/acquired). When the system is first initialized, the user can specify which of the set of observers are to be run as detectors. A detector is an observer whose task to monitor the incoming data streams and to report back whenever it finds that its criteria for making the observation are met. Once all of the initial detectors have been activated, the runtime agent begins to monitor the frames of signal data and arranges for the execution of each active observer. Whenever an observer is invoked, it is presented with the data values for its designated channel(s) at the next index for which data is available. If no new data has arrived since it last executed, control is passed to the next active observer that has not yet been invoked this cycle.

Figure 9:
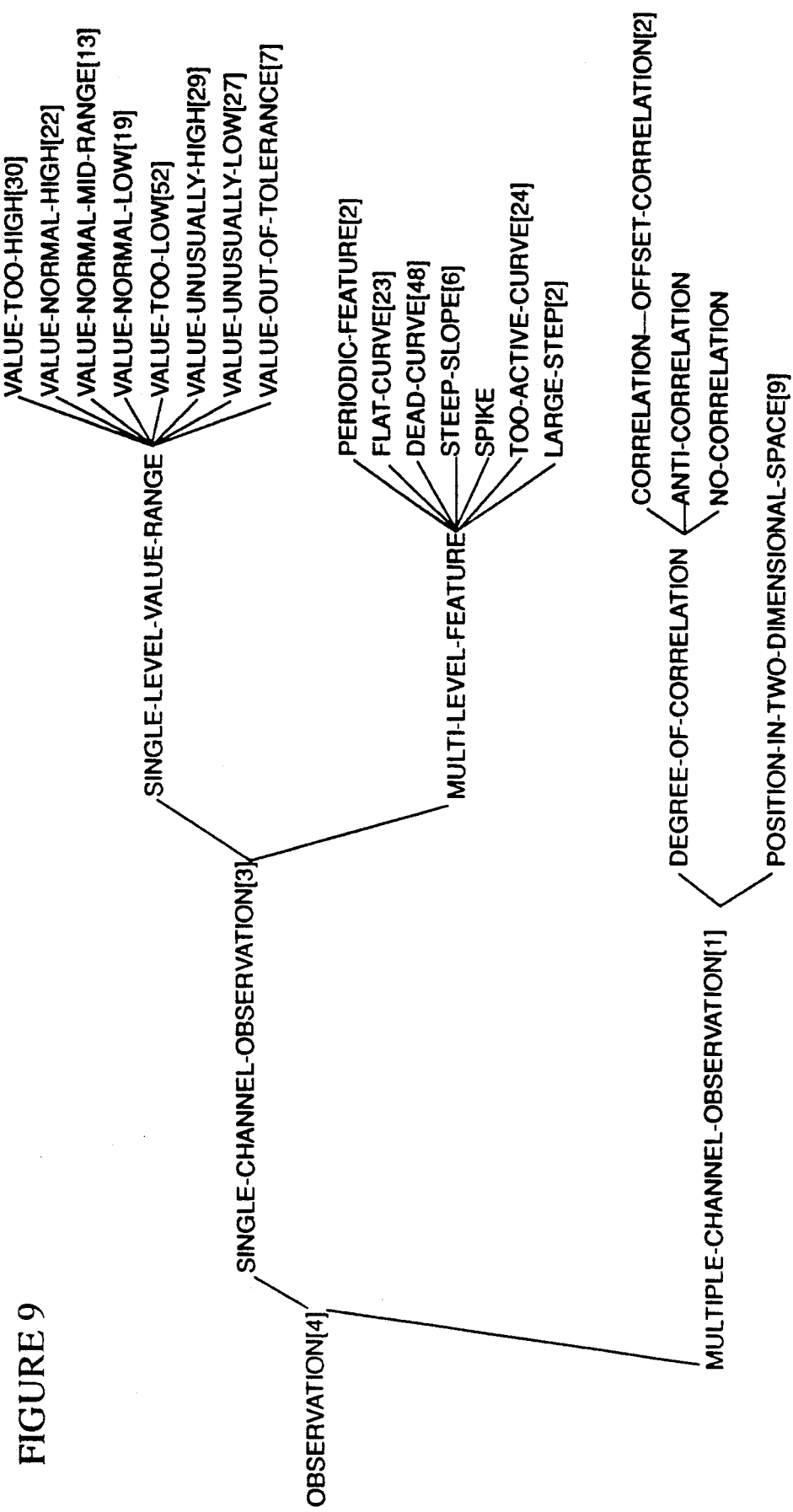
Figure 10:
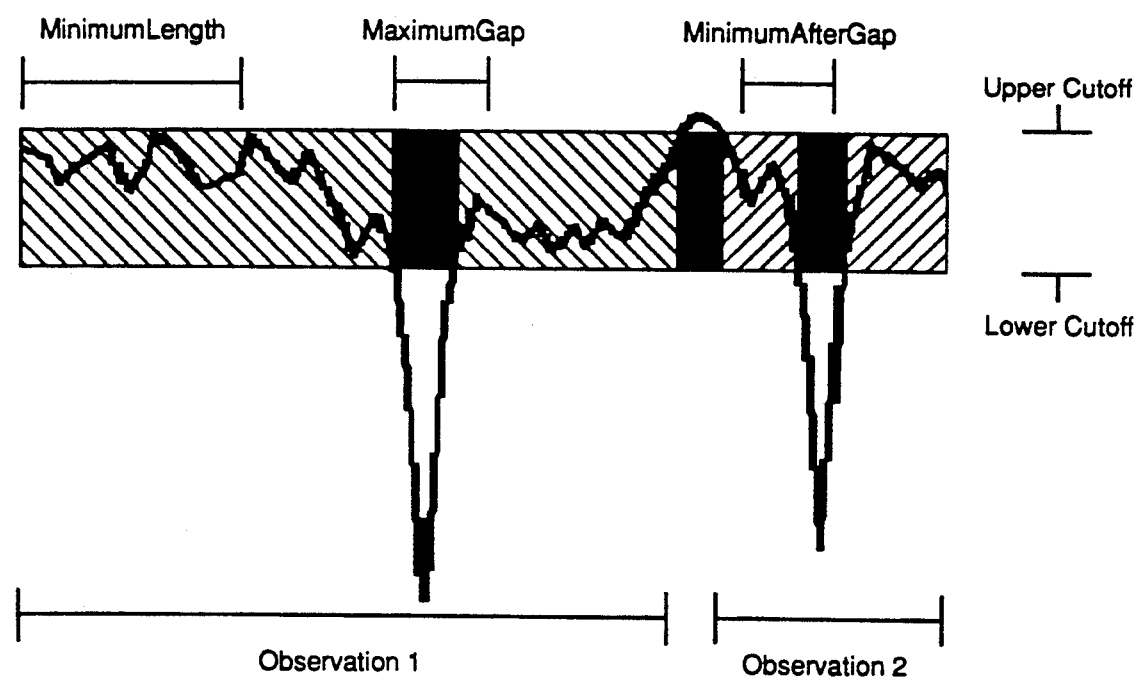
FIG. 10 illustrates an example of time interval criteria for defining an observation in accordance with the present invention.

When an observer is invoked, the computation that is specified by its definition is executed, and the logical test is performed. If the test is passed, then the observer's controlling parameters, MinimumLength, MaximumGap, and MinimumAfterGap are referenced in order to determine whether the criteria for the presence of the observation have been met. MinimumLength is the shortest interval over which the test must be passed before the observation is asserted. MaximumGap is the longest interval over which the test may fail and still be considered part of the original observation. MinimumAfterGap is the shortest interval after a gap that the test must again be passed before the entire interval is considered to be the same observation. FIG. 9 graphically shows how these parameters affect an observer's operation. These parameters allow the domain expert to deal with noisy data or intermittent phenomena in a general way.

When a detector's criteria are met, the presence of an observation is asserted. If the trigger observation participates in any networks, then the runtime agent activates all of these networks. All of the most specific situations that can explain the triggered observation are found. Then, confirming evidence for each situation is gathered by traversing the network node defined for that situation in a goal-driven manner. In the course of gathering this evidence, additional observers may need to be invoked in response to this processing. These additional observers, known as confirmers, are also activated to run within the context of the trigger observation. These confirmers use the same computations and tests as their detector counterparts, but rather than asserting the presence of an observation, they compute a truth value for the g10 observation. Currently, a five valued logic is being used that is computed based on the fraction of the number of samples that meet the test criteria in the interval in question. When these confirmers report back with further information, these updates in belief are processed in a data-driven manner for efficiency.

Note that as each cycle of observer firing takes place, the extent of the trigger observation will grow as long as its criteria continue to be met. This implies that the interval over which the detectors and confirmers that depend on this observation need to run will also grow. As long as the criteria which caused the trigger observation to be asserted persist, the analysis network will continue to gather evidence in order to arrive at its conclusions. At any point in time, the network is capable of providing its "best guess" as to the most likely cause based on all the current information. It also knows how many confirmers are still in process. Once the criteria for an observation are no longer met, the confirmers are deactivated, the network determines its final estimation of the most likely cause, and the system returns to its steady-state monitoring.

In the current implementation, any confirmers that are activated in response to a trigger observation are added to the original set of detectors that were present at the start of execution. Since, in general, a given detector needs to look at multiple samples (MinimumLength) before it can assert an observation, these newly activated observers will start off several samples "behind" the triggering detector. The runtime agent maintains an internal circular buffer of the most recent data frames so that some historical data is always available. Depending on the incoming data rate, these observers may eventually catch up to the original set or they may lag behind throughout their activation interval.

The present invention is not a hard real time system in the sense that it cannot guarantee a fixed time response to a particular input (data frame). Despite the uncertainty in response time, the present invention does have a number of properties that make it amenable to real time operation. These are discussed below.

Overrun Handling - The amount of time required by the network to completely process a particular input is indeterminate. It is conceivable that a new input frame could arrive before the processing of the previous one has completed. The network explicitly allows the observation process to fall behind acquisition by an arbitrary amount during a flurry of activity and then "catch up" to the incoming data when the system becomes more quiescent. As long as there is sufficient processor power in the amortized sense, then the network will be able to successfully perform all of its functions regardless of how the observations are clustered. The cost for this capability is memory space for storing the buffer of data frames. If, during a period of extremely active behavior, the system falls so far behind that the oldest frames in the buffer need to be discarded before an observer has a chance to process it (i.e., the amortized processing assumption is violated), the system signals an overrun condition to each observer that is affected so that they can take appropriate recovery actions. These recovery actions depend on the domain under study. If the domain is such that the missing data can be recovered (e.g., some instrumentation or data analysis systems), possible recovery schemes include presenting the data at a different (slower) sampling rate, and making multiple passes over the data with different observers being active during each pass.

Dynamic Observer Activation/Deactivation - Since in some applications there may be significantly more observers defined than there are computational resources to support, the user may decide to select only a subset of the observers to run as primary detectors. This selection may depend on such things as the degree of problem coverage desired, expectations concerning possible results, desired sampling rate, etc. If it is possible to define "lightweight" detectors to determine certain intervals of interest, the subordinate detector capability can then be used to opportunistically activate additional "heavyweight" detectors that will focus on the phenomena of interest to do a more detailed analysis on the selected intervals.

Multiple Simultaneous Hypotheses - A different aspect related to real time operation concerns the fact that in many applications once the data has passed through the system, it is no longer available. This can be due to extremely high data rates, lack of secondary storage capacity, etc. This implies that if there are multiple phenomena occurring simultaneously, the system must be able to process them in parallel. The framework of the present invention is inherently parallel, and all situations relevant to a particular trigger observation are pursued in that manner. The fact that multiple observers are active at any time and that each observation is identified and extended on a frame by frame basis also contributes to the overall parallelism in the system.

Current State Knowledge - As discussed briefly above, the system has self knowledge of its state throughout the problem solving process. For example, in addition to using partial information to arrive at an interim explanation for the trigger observation after each network exploration cycle, the system knows how many confirmers are still actively pursuing further belief updates. These capabilities would allow an (as yet unused) resource management aspect to be employed to intelligently direct the problem solving in a resource limited scenario.

Knowledge Acquisition Interface

Figure 4:
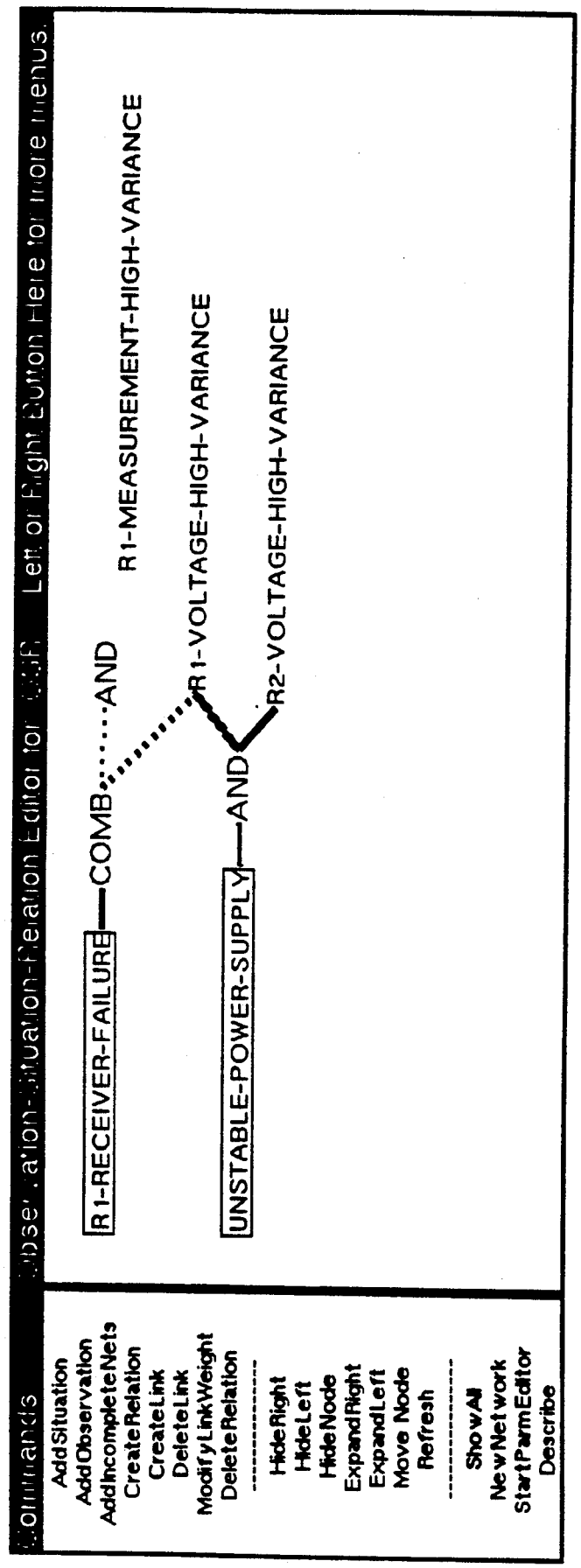
Figure 6:
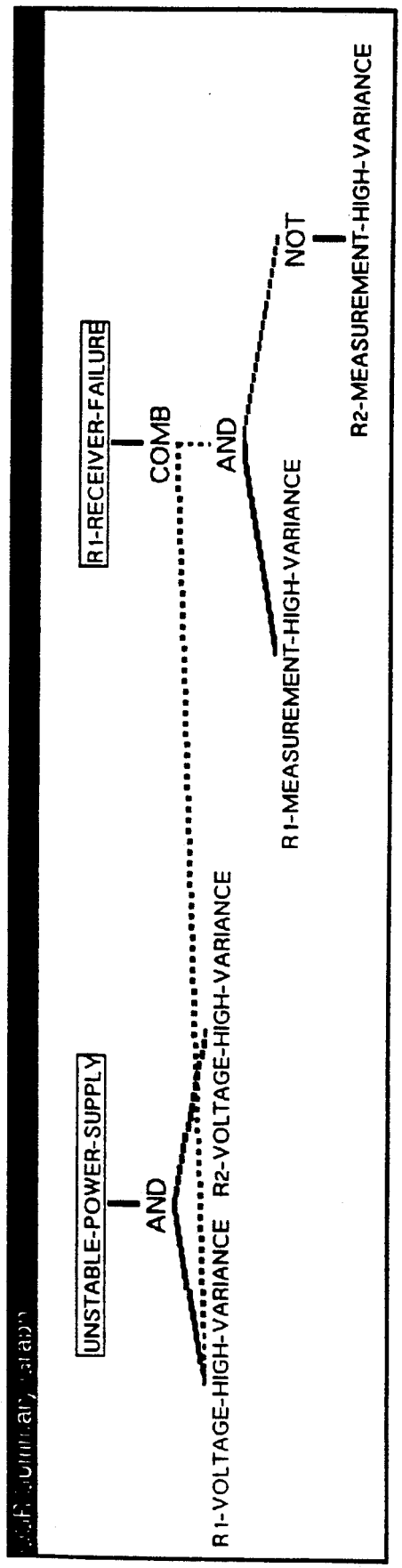

In addition to the modeling and execution aspects, the present invention provides a comprehensive set of knowledge engineering tools to support the development of applications. This environment allows relaxation of the traditional requirement of using a knowledge engineer to translate between a domain expert's vision of the domain and a representation that is computationally sound. The Network Editor shown in FIG. 4 was used to build the example network discussed in the second embodiment, discussed herein. The network constructed in FIG. 4 provides an interactive environment for controlling the runtime execution of the system as well as the explanation of the system's findings concerning observations, situations, and supporting evidence. FIG. 5 shows a specialized object editors developed for defining the criteria for an observer, while FIG. 6 depicts a summary of the network constructed using the editor of FIG. 4.

Sensor Monitoring Embodiment in a Material Properties Analysis Set-up

Figure 3:
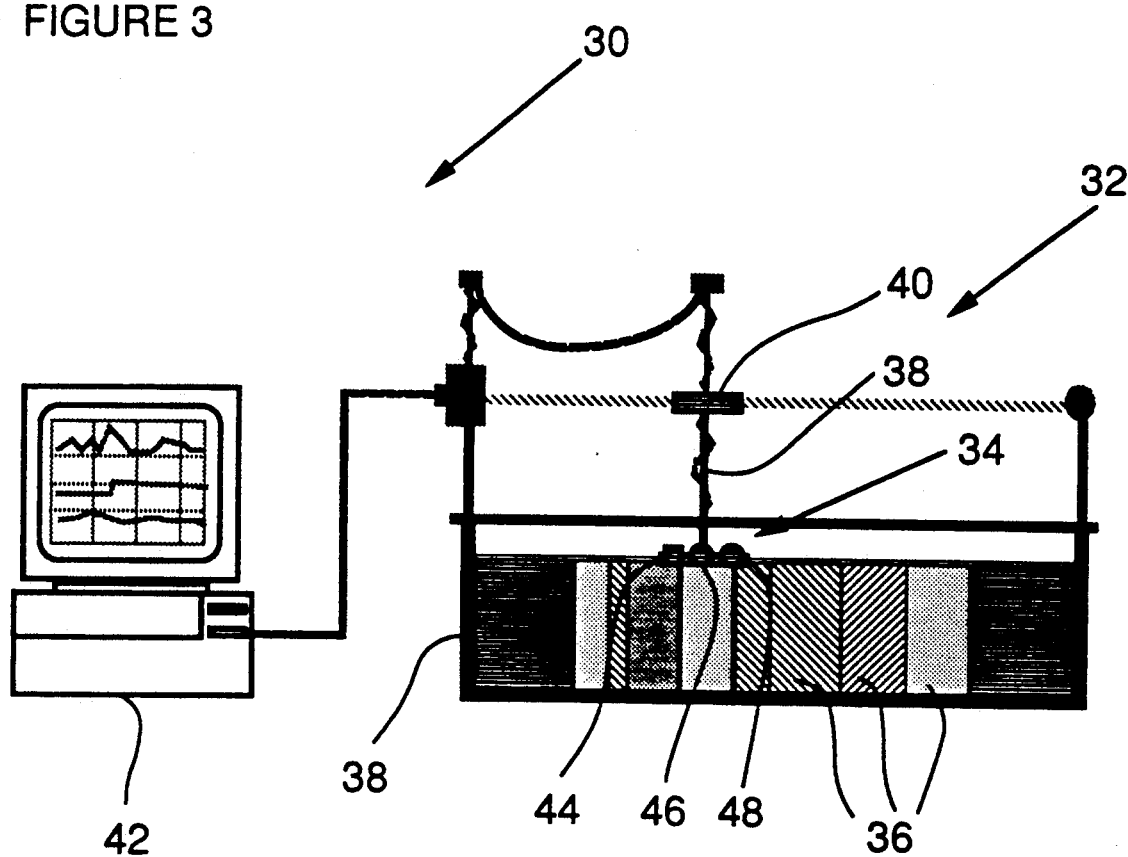

The laboratory set-up 30 shown in FIG. 3 illustrates an embodiment of the present invention for monitoring the sensors in a system for determining the properties of materials. The test fixture 32 is designed to make performance tests on various configurations of transmitters and receivers 34 that will be used to make measurements of properties of test materials 36. The test tank 38 contains slabs of materials 36 of various types (e.g., metal, plastic, glass, etc.), and the test fixture 32 consists of an arm 38 which will scan the sensors 34 over the sequence of materials 36. In addition to controlling the scanning motors 40, the lab computer 42 also acquires various readings from the sensors 34 at fixed intervals during the course of the scan. This data contains status information (e.g., voltages) as well as the measurements themselves.

The method and apparatus hereof monitors the sensor experiments in order to annotate the experimental results with respect to any anomalies that may have affected the experimental conditions. Preferably, the test engineer monitors the experiments in near real time so that corrective action can be made in near real time. Various observers and analysis networks are defined to watch for erratic measurement behavior (e.g., excessive noise, spikes), proper operation of the sensor electronics, and agreement with expected results (e.g., differences between measured and actual values for the material properties).

For example, consider the configuration of FIG. 3 consisting of a single transmitter 44 and two receivers 46,48 (a near receiver, R1, and a far receiver, R2). Among the detectors that would be invoked on each new data frame is one (the R1-VOLTAGE-VARIANCE-DETECTOR shown in FIG. 5) that monitors the voltage for the near receiver (R1-VOLTAGE) for instability. Thus, the domain expert uses the editor of FIG. 5 to define the observer criteria for the voltage instability. If the R1 voltage meets this defined criteria, an "observation" is made. Note from FIG. 5 that the voltage variance can be defined algorithmically, and also other criteria can be defined such as time interval criteria. That is, cutoff, minimum length, and maximum gap criteria be defined by the domain expert as shown in the lower portion of FIG. 5. This concept is illustrated in FIG. 9 on an analog waveform of exemplary voltage raw data.

If the R1 voltage variance observation is made, the analysis networks shown in FIG. 6 will be activated in order to determine whether the voltage changes are due to problems with the sensor power supply or the receiver 46 itself. In determining the most likely cause for the triggering observation, the analysis network will request that several other observers (confirmers) be activated in order to check the other values that were acquired during the interval in which the voltage was unstable. In this case, it includes checking both the near and far receiver measurement channels (R1 and R2 respectively) for stability as well as the voltage channel for the far receiver 48 (R2-VOLTAGE).

Figure 7:
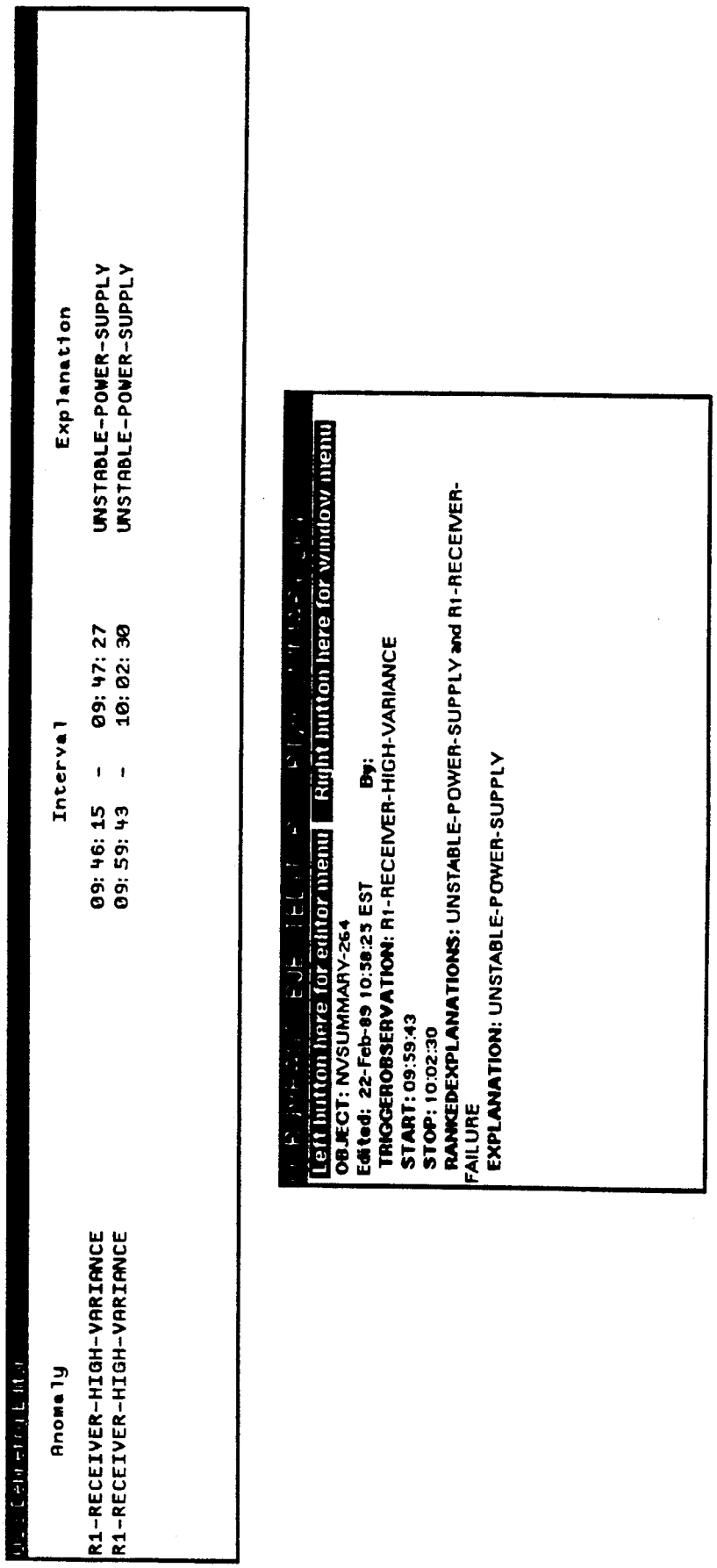
Figure 8:
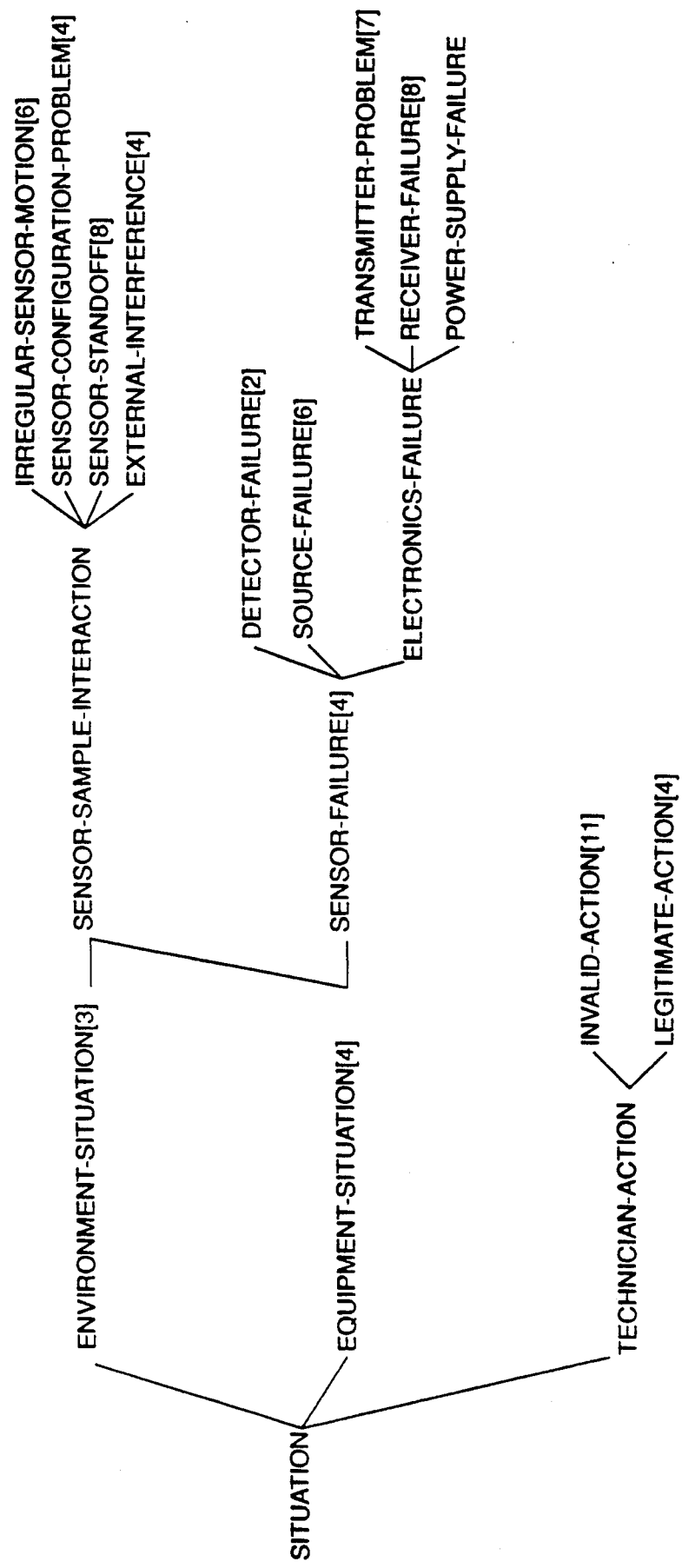

If both voltage channels are found to be unstable, then the problem is most likely due to a power supply failure. If the R1 measurement readings are unstable, but the R2 measurement readings are not unstable (i.e., normal fluctuation), then the problem is probably due to a failure of the R1 receiver 46. If none of the confirmer observations come back with conclusive evidence to support either hypothesis, then network of FIG. 6 would record an "unknown" cause for the original anomaly. In any event, the anomaly and the explanations considered would be noted, and the monitoring process would proceed. FIG. 7 illustrates an observation report generated for an unstable power supply anomaly. Note that for complex analysis networks, the network can generate reports such as shown in FIG. 7 incrementally, that is as the network is analysing the anomaly by invoking additional observers, or the system can be configured to generate a report at the conclusion of its analysis giving its best explanation.

Sensor Monitoring Embodiment in a Well Logging Environment

Figure 11:
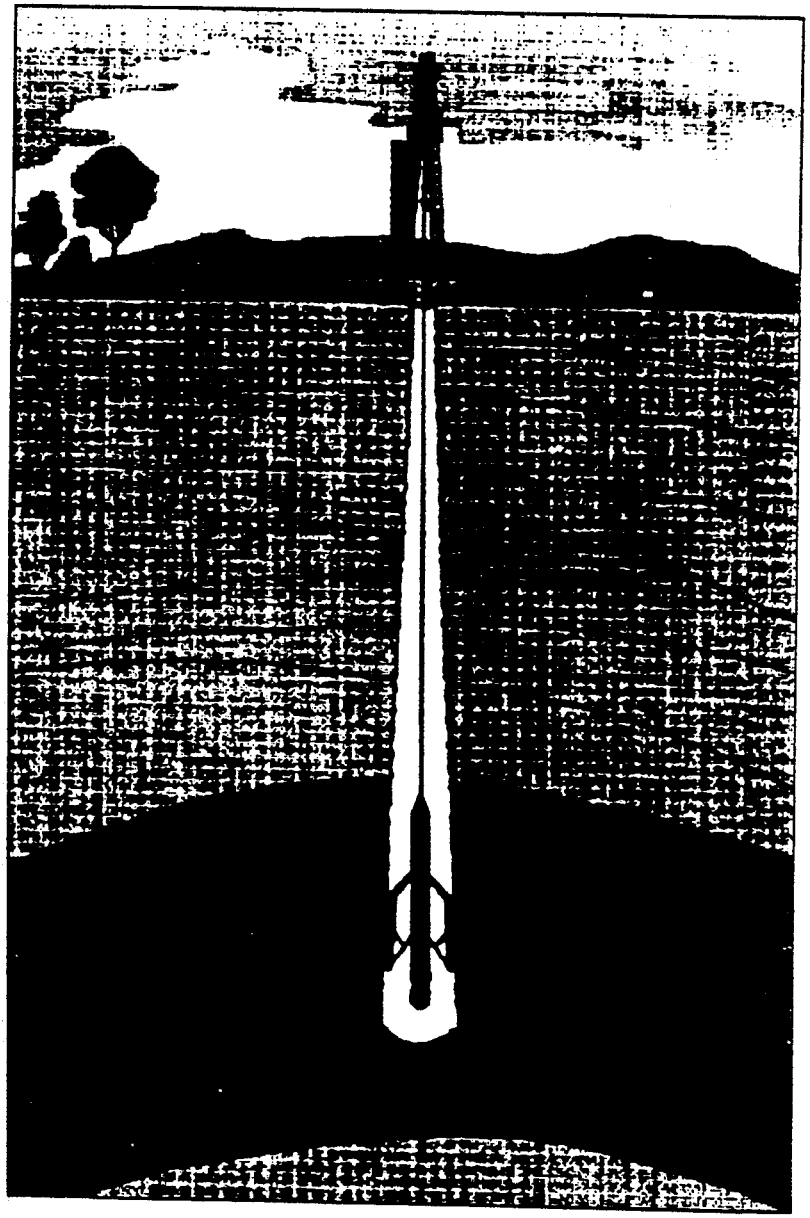

Wireline well logging is a technique used to evaluate the hydrocarbon potential of subterranean boreholes. During a logging survey (see FIG. 11), an instrument package containing a variety of sensors is lowered into a borehole at the end of a long cable (called a wireline), and as the instrument package is raised back to the surface, measurements are made at regular intervals of the properties of the subsurface rock formations and the fluids they may contain. Economic decisions involving millions and even billions of dollars are made based on the measurements acquired during such a survey.

Because of the large sums of money involved, wireline logging service companies spend a great deal of effort on ensure that their surveys are as reliable and accurate as possible. There are a number of factors that can affect the quality of a survey. Among them are: tool failure (a logging tool or one of its components experiences a hardware failure that causes erroneous measurements to be sent to the uphole recording system), sensor miscalibration (the tool itself is functioning properly, but due to an error in the calibration of the device, erroneous measurements are recorded), environmental effects (the environment within the borehole itself may affect the measuring process, e.g., the side of the borehole wall may have become eroded causing a sensor to lose contact with the formation), and engineer action (the engineer conducting the survey may have caused an adverse effect on the measurement process due to some interaction with the surface system, e.g., the engineer may have applied electrical power to a particular tool to close a caliper arm from a sticky part of the well; the resulting current flow could perturb the resistivity measurements). The monitoring of the data acquisition process in order to avoid or minimize these problems is known as log quality control.

A prototype system in accordance with the present invention has been developed to automatically perform the log quality control function in real time concurrent with the logging process. This system has been described in detail in U.S. patent application Ser. No. 128,658 (incorporated by reference) and is believed to be the most preferred embodiment of the present invention. This prototype version was implemented in Common Lisp using the HyperClass object-oriented programming system and is fully described in Ser. No. 128,658. The HyperClass programming system may be commercially obtained from Sun Microsystems, Inc. or Schlumberger Technologies, Inc., and as those skilled in the art will appreciate, most of the commercially available object-oriented programming systems are capable of implementing various embodiments of the present invention for diverse applications.

In this embodiment, the runtime agent and network of the present invention runs on a dedicated processor and is connected to the data acquisition system via an Ethernet connection. This application is comprised of over 350 different kinds of observations and more than 200 distinct situations. Each trigger observation participates in an average of 3–4 analysis networks. The observations correspond to anomalous features that may appear on the logs, and the analysis networks are used to determine the most likely cause of the anomaly, i.e., tool failure, miscalibration, environment, or engineer action. The observers used in this embodiment range from very simple bounds checks (based on the characteristics of the sensor designs), to models based on the physics of the response of multiple sensors to the formation being measured, to a rule-based detector which applies knowledge of the local geology to determine if the measurements are consistent with data measured in neighboring wells.

Figure 13:
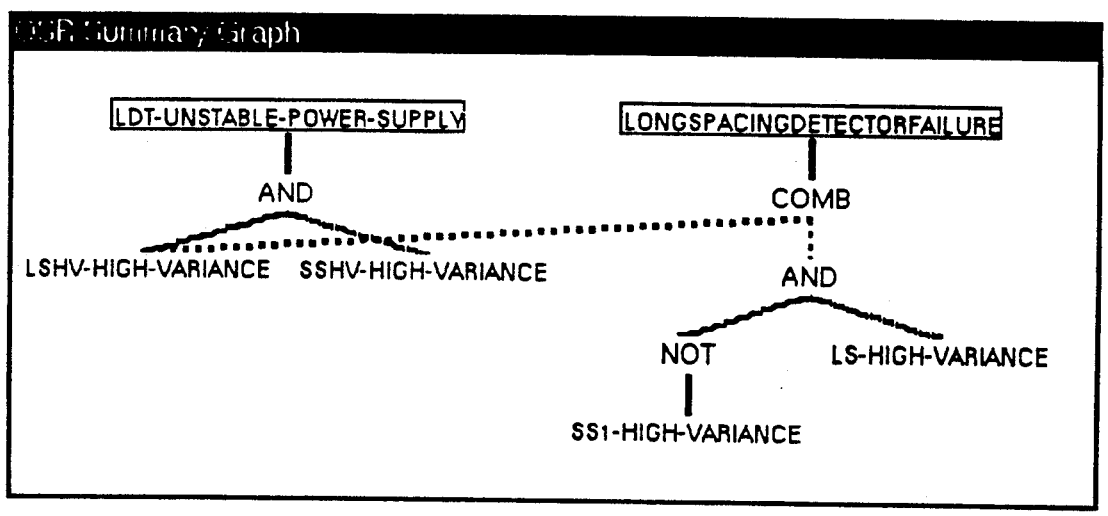

One of the checks for the Litho-Density logging tool (LDT) involves monitoring its high voltage channels LSHV and SSHV for stability. FIG. 12 shows the LSHV-ACTIVE-DETECTOR which is one of the observers used for this purpose. If its criteria for stability are met, the LSHV-HIGH-VARIANCE observation is asserted, and the analysis network shown in FIG. 13 is activated. This activation would cause confirmers to be invoked to examine the SSHV voltage channel as well as the LS and SS1 count rate channels. Depending upon what the confirmers see for these channels in the interval of interest, the system will either conclude that the LSHV-HIGH-VARIANCE observation was caused by an LDT power supply failure (SSHV-HIGH-VARIANCE was also confirmed) or a long spacing detector failure (LS-HIGH-VARIANCE was present, but SS1-HIGH-VARIANCE was not). If neither of these conclusions are supported by sufficient evidence (i.e., the confirmers could not conclusively prove or disprove their assertions), then the system will ascribe an "unknown" cause to the trigger observation. In any event, the results will be noted, and the monitoring process will proceed.

This anomaly detection and classification system has been field tested on a variety of logging jobs with good success. In several test cases, the system was able to pinpoint problem logs that even the experienced human experts missed. In this application, the domain expert was able to specify the majority of the analysis networks with minimal assistance from the knowledge engineers.

SUMMARY

The declarative approach to domain modeling described herein is believed to be a very powerful paradigm for a number of reasons. First, it provides domain experts with a structured, high level means of defining the phenomena of interest and how they relate to real world events. Second, the object-based form of the observer definitions makes it possible to automatically generate code for use in a variety of runtime environments. Third, the same representation that is used to define the abstract behavior of an observer can be used in either detection or confirmation modes. Finally, this declarative representation can be used to generate runtime explanations of how an instantiation of a particular analysis network behaved with respect to a particular data sequence.

We claim:

1. A method for monitoring and analyzing a plurality of signals from sensors in a system comprising the steps of:

providing an analysis network defining behavior and problem modes of the system;

establishing one or more observers for each signal and defining criteria for each observer;

monitoring a signal value with a corresponding observer and detecting when the signal value does not meet its defined criteria;

reporting an observation from the detecting observer to the analysis network if said signal value does not meet its defined criteria;

analyzing the observation with the network, including the substeps of invoking one or more additional observers, reporting signal values from each respective observer to the network, and determining whether said one or more additional observers meet respective defined criteria; and generating an explanation of the observation from the network.

2. The method according to claim 1, wherein the steps are performed to generate said explanation during monitoring of additional signals from said sensors.

3. The method according to claim 1, wherein the measurement signals are derived from a plurality of sensors.

4. The method according to claim 1, including the step of monitoring a number of signal values with respective observers in near real time.

5. The method according to claim 1, the analyzing step including observing additional signal values occurring prior to the observation.

6. The method according to claim 1, the establishing step including establishing at least some of the signals with multiple observers.

7. The method according to claim 1, the establishing step including having a least one observer which monitors multiple signals.

8. The method according to claim 1, prior to said monitoring step including the step of organizing a number of signal values into a data frame and indexing sequential measurement signals into sequential data frames.

9. The method according to claim 8, wherein the identifying index for sequential data frames is time of data measurement.

10. The method according to claim 8, wherein the identifying index for sequential data frames is the physical location of the sensors acquiring the signals.

11. The method according to claim 8, wherein the signal values in each data frame represent separate measurements of the system under investigation.

12. The method according to claim 8, wherein the criteria for reporting an observation includes an algorithm for testing a signal value in a particular data frame and a time interval for reading successive data frames.

13. An apparatus for monitoring and analysing signals from a system comprising:
 means for acquiring a plurality of signals as digital values each indicative of phenomena in the system;
 observer means coupled to the acquiring means for testing at least one of said signal values for the presence of an anomaly in said at least one signal values and for generating an observation if an anomaly is detected; and
 network means containing a number of stored observations and situations linked by specified relationships, activatable if an anomaly is detected by the observer means, for retrieving other signal values and analyzing the observation and other signal values to output a situation as an explanation for the anomaly.

14. The apparatus according to claim 13, the observer means being operable for testing for anomalies in two or more signal values in near real time.

15. The apparatus according to claim 13, the anomaly defined as including algorithm criteria for the signal value and a time interval test for the presence of signal values not meeting the criteria.

16. The apparatus according to claim 13, the network means being operable for outputting an explanation as a best guess at any time during analysis.

17. The apparatus according to claim 13, the network means being operable for outputting an explanation after the network means has completed its analysis.

18. The apparatus according to claim 13, wherein the acquiring means includes a plurality of acquisition sensors and means for converting sensor signals to digital values.

19. The apparatus according to claim 18, wherein the acquiring means includes a computer buffer for receiving the sensor signal digital values.

20. The apparatus according to claim 15, wherein the buffer includes a plurality of indexed data frames for accepting groups of successive signals.

21. The apparatus according to claim 20, wherein the data frames are indexed by time of signal acquisition.

22. The apparatus according to claim 20, wherein the data frames are indexed by location of the sensor acquiring the signal.

* * * * *